(12) United States Patent
Yamazaki et al.

(10) Patent No.: US 7,484,862 B2
(45) Date of Patent: Feb. 3, 2009

(54) LIGHT SOURCE APPARATUS AND IMAGE DISPLAY APPARATUS

(75) Inventors: Shoichi Yamazaki, Yokohama (JP); Kazutaka Inoguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 11/467,362

(22) Filed: Aug. 25, 2006

(65) Prior Publication Data

US 2007/0047230 A1    Mar. 1, 2007

(30) Foreign Application Priority Data

Sep. 1, 2005    (JP)    ................ 2005-253143

(51) Int. Cl.
*F21S 8/00* (2006.01)

(52) U.S. Cl. .................. 362/268; 362/19; 362/231; 362/245

(58) Field of Classification Search ............ 362/19, 362/231, 245, 268
See application file for complete search history.

(56) References Cited

U.S. PATENT DOCUMENTS

| 5,828,471 A | * | 10/1998 | Davis et al. ............ 359/15 |
| 2004/0080938 A1 | * | 4/2004 | Holman et al. .......... 362/231 |

FOREIGN PATENT DOCUMENTS

JP    2004-311353    11/2004

* cited by examiner

*Primary Examiner*—Sandra L. O'Shea
*Assistant Examiner*—Meghan K. Dunwiddie
(74) *Attorney, Agent, or Firm*—Morgan & Finnegan, LLP

(57) ABSTRACT

A light source apparatus is disclosed which is capable of emerging predetermined linearly polarized light while a loss of light amount is reduced. The light source apparatus comprises plural light-emitting elements which are disposed so that their light-emitting surfaces face the direction of an emergence surface of the light source apparatus, and a polarization selective element which transmits a light component with a first polarization direction and reflects a light component with a second polarization direction different from the first polarization direction. The apparatus further comprises a reflecting surface which is disposed at a position closer to the light-emitting elements than the polarization selective element and reflects the reflected light from the polarization selective element to the polarization-selective element side.

6 Claims, 9 Drawing Sheets

LIGHT SOURCE APPARATUS AND IMAGE DISPLAY APPARATUS

BACKGROUND OF THE INVENTION

The present invention relates to light source apparatuses, which are used in image display apparatuses such as head mounted displays (HMDs) and illuminate image-forming elements such as reflective liquid crystal panels.

Conventional HMDs, which includes a transmissive liquid crystal panel with color filters, use a cold-cathode-tube type white flat light source to illuminate the liquid crystal panel.

In contrast, many recent HMDs use a light source capable of emitting light of three (RGB) colors and adopt a color-sequential displaying method in which images on the liquid crystal panel are rewrite in accordance with a light-emission switching timing of the light source.

Moreover, color LEDs are often used as a light source of HMDs. The color LED has three light-emitting portions of RGB, and the emission color and emission intensity of the LED can be electrically controlled.

In such light source apparatuses, two to four LEDs are often placed on a side face of the apparatus chassis. Such a side-face LED placement is effective for thinning flat light source apparatuses, but unsuitable for high-intensity light sources since many LEDs cannot be placed on the side face.

Adopting a so-called bottom LED placement that has been disclosed in Japanese Patent Application Laid-Open No. 2004-311353 makes it possible to place many LEDs to enable high light intensity. In the bottom LED placement, many LEDs whose light-emitting surfaces face the direction of the emergent surface of the light source apparatus are placed on the bottom of the apparatus chassis.

The light source apparatus disclosed in Japanese Patent Application Laid-Open No. 2004-311353 uses LEDs (bullet-shaped LEDs) with a domed lens whose light radiation angle is narrow to reduce unevenness of luminance and color on the emergent surface (or, the light source surface), which is a defect of the bottom LED placement. Further, in the above-mentioned light source apparatus light from the LEDs is reflected by two reflecting plates and then diffused by a diffusing plate. This achieves a thin light source apparatus capable of reducing unevenness of luminance and color.

A liquid crystal panel needs to be illuminated with linearly polarized light (P-polarized light or S-polarized light). Therefore, a polarizer is provided in light source apparatuses.

However, common polarizers transmit light with a polarization direction corresponding to the polarizing axis direction thereof and absorb light with a polarization direction different from the polarizing axis direction. Accordingly, using a common polarizer for obtaining linearly polarized light reduces the amount of light from the LEDs and therefore it is difficult to increase the light intensity without changing the number of LEDs or with reduction thereof.

BRIEF SUMMARY OF THE INVENTION

One of the objects of the present invention is to provide a light source apparatus capable of emerging predetermined linearly polarized light while a loss of light amount is reduced.

According to an aspect, the present invention provides a light source apparatus which comprises plural light-emitting elements which are disposed so that their light-emitting surfaces face the direction of an emergence surface of the light source apparatus, and a polarization selective element which transmits a light component with a first polarization direction and reflects a light component with a second polarization direction different from the first polarization direction, the light components being emitted from the plural light-emitting elements. The light source apparatus further comprises a reflecting surface which is disposed at a position closer to the light-emitting elements than the polarization selective element and reflects the reflected light from the polarization selective element to the polarization selective element side.

DETAILED DESCRIPTION OF THE PREFERRED EMBODIMENTS

Preferred embodiments of the present invention will hereinafter be described with reference to the drawings.

Figure 1A:
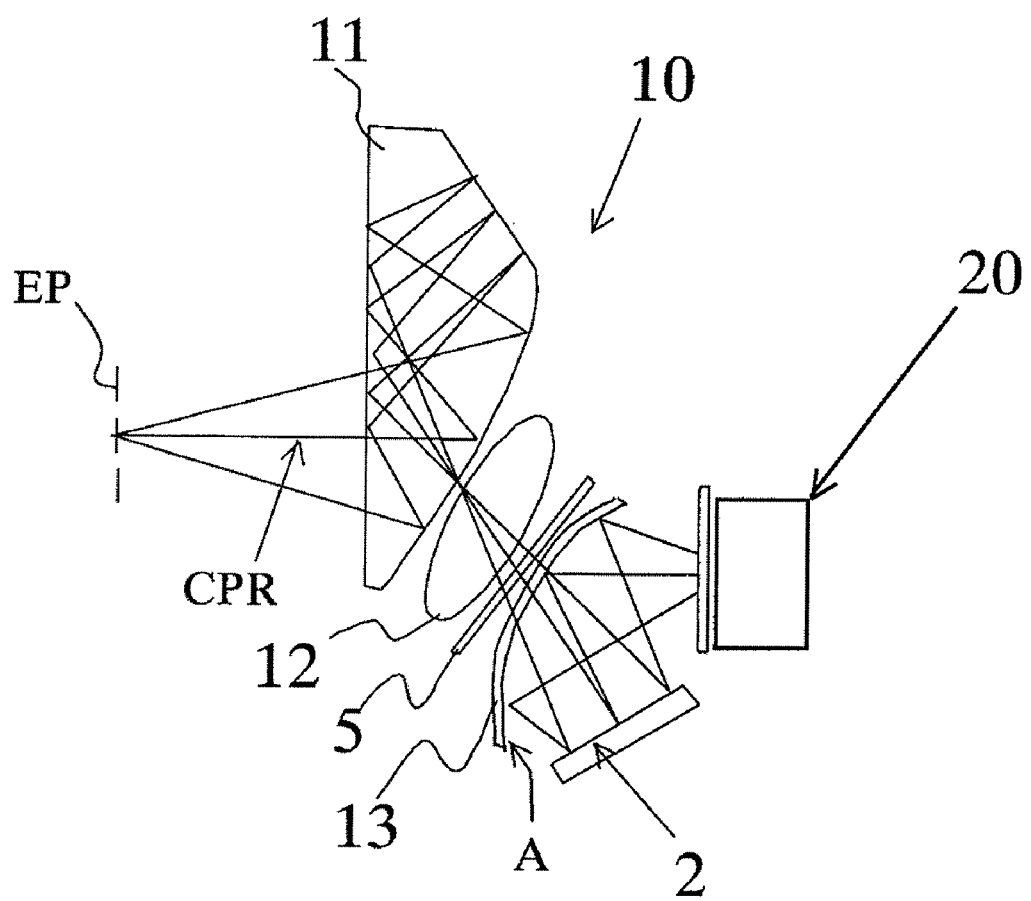
FIG. 1A is a yz cross sectional view showing the configuration of the HMD using the light source unit that is an embodiment of the present invention.
Figure 1A:
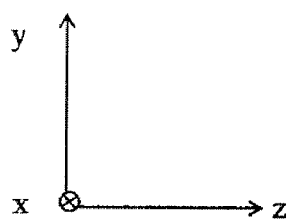
Figure 1B:
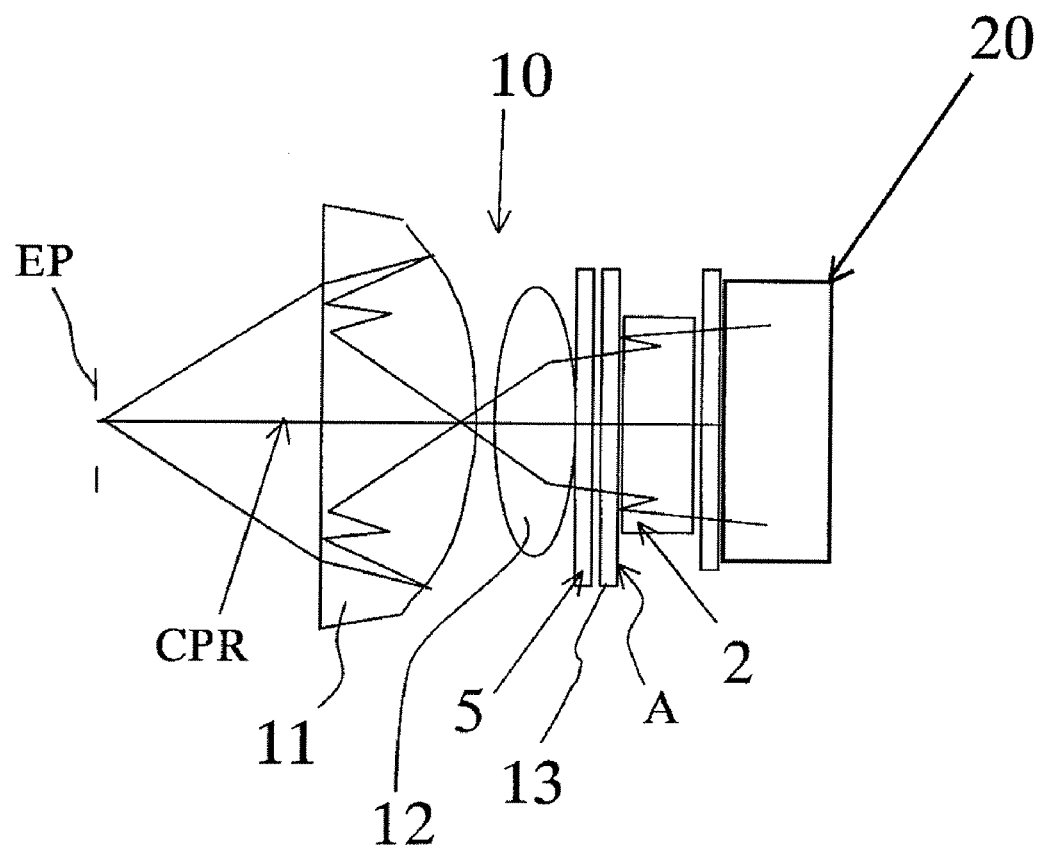
FIG. 1B is an xz cross sectional view showing the configuration of the HMD of the embodiment.
Figure 1B:
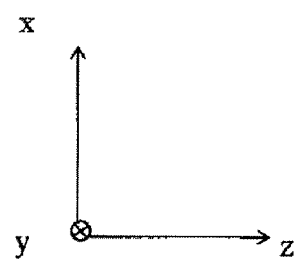
Figure 11:
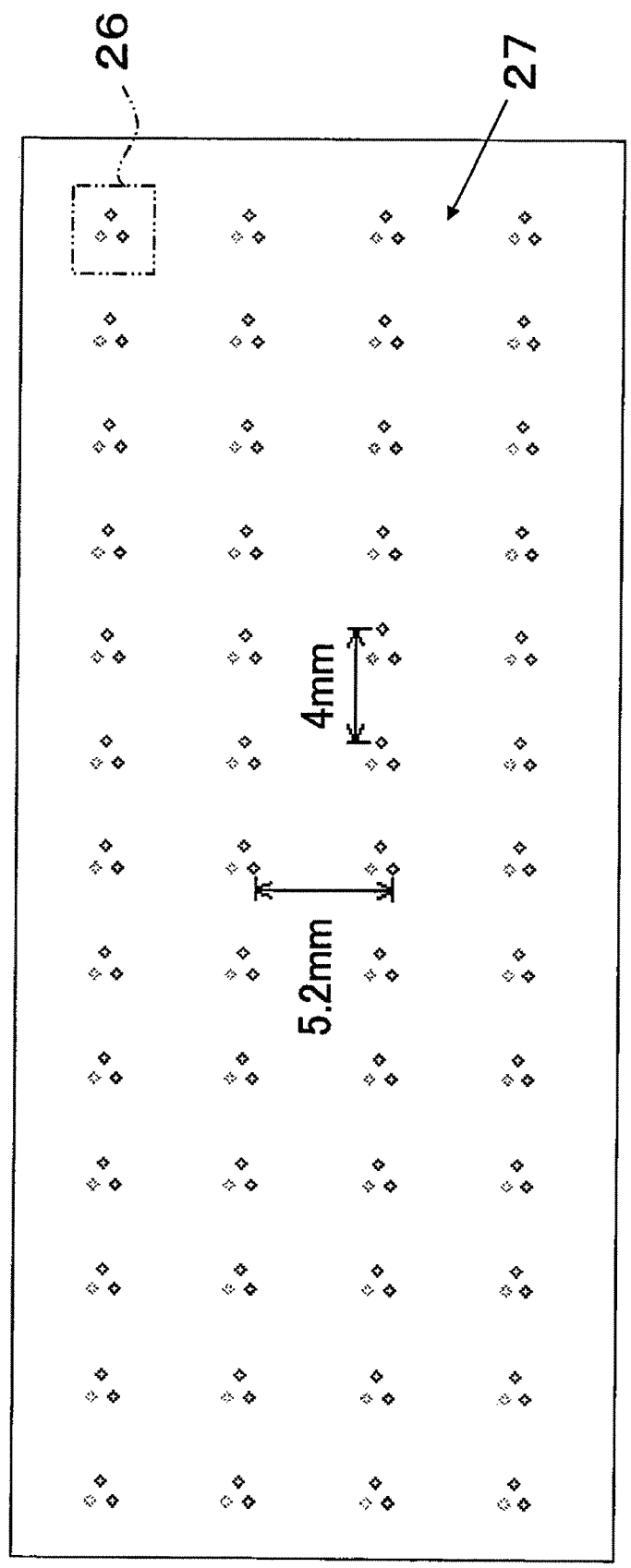
FIG. 11 is a layout chart showing a surface-mounted LED light source used in the light source unit shown in FIG. 10.

FIGS. 1A and 1B show the basic configuration of the HMD (image display apparatus) that is an embodiment of the present invention. In FIGS. 1A and 1B, 11 denotes a prism, and 12 a lens. 5 denotes a polarizing plate that is an analyzer, and 13 a lens including a semi-transmissive/reflective surface A and having optical power (that is, the inverse of the focal length) in the yz cross section. These prism 11, lens 12, polarizing plate 5 and lens 13 constitute a displaying optical system 10.

2 denotes a reflective liquid crystal panel. 20 denotes a light source unit that is a light source apparatus. The light source unit 20 converts light from LEDs, which are plural light-emitting elements and described later, into linearly polarized light with a predetermined polarization direction (or, a first polarization direction) and causes it to emerge.

FIG. 1A shows the yz cross section of the HMD. This yz cross section is a cross section including a central angle-of-view principal ray CPR. The central angle-of-view principal ray CPR passes through a point corresponding to the center of an image plane of a virtual image that is observed by an observer and a central point of the exit pupil EP of the displaying optical system 10. In other words, the yz cross section is a cross section including the central angle-of-view principal ray CPR bent by at least one decentered reflecting curved surface that constitutes the displaying optical system 10.

On the other hand, FIG. 1B shows the xz cross section of the HMD. This xz cross section is a cross section perpendicular to the yz cross section. The xz cross section is defined so as to include a normal of a light source surface formed by a diffusing plate, which constitutes the light source unit 20 and is described later, in this embodiment. The diffusing plate in the light source unit 20 receives the light from the LEDs and diffuses at its diffusing surface to form a secondary light source plane. This diffusing surface of the diffusing plate hereinafter is referred to as the light source plane.

In FIG. 1B, the optical elements are projected onto the xz cross section because all principal rays do not actually exist in the xz cross section.

First, the description will be made of the basic optical path and the optical action in this embodiment. The linearly polarized light that emerged from the light source surface is reflected by the reflecting surface A of the lens 13 which constitutes an illumination optical system and then illuminates the liquid crystal panel 2.

The light (linearly polarized light) optically rotated and reflected by the liquid crystal panel 2 is transmitted trough the lens 13 (the reflecting surface A), analyzed by the analyzer 5, and then forms displaying light. The displaying light is introduced as an enlarged image of an original image, which is formed in the liquid crystal panel 2, to the position of the exit pupil EP of the displaying optical system 10 by the optical power of the lens 12 and prism 11. An observer can observe the enlarged image (virtual image) through his/her eye (pupil) positioned in an observation area around the exit pupil EP.

Figure 2:
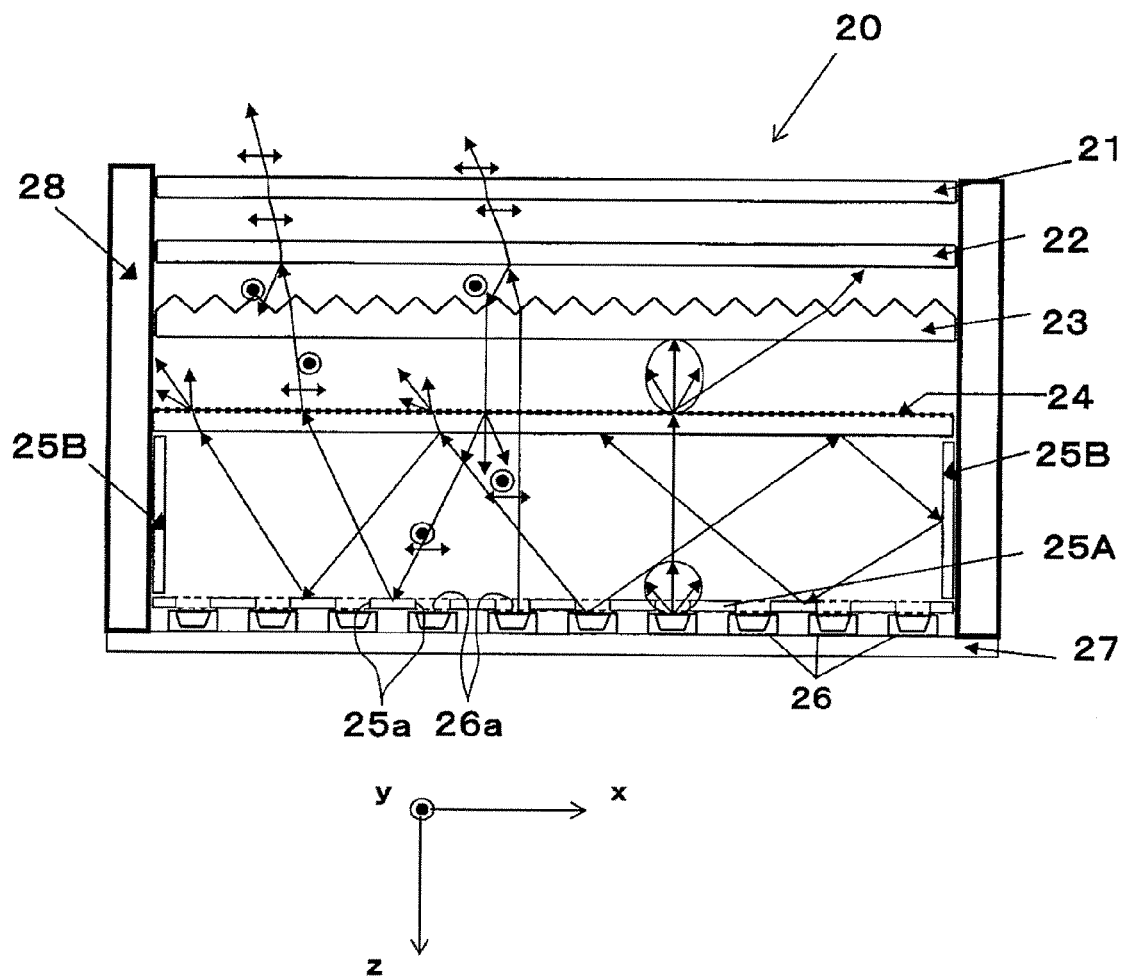
FIG. 2 is an xz cross sectional view of the light source unit of the embodiment.
Figure 3:
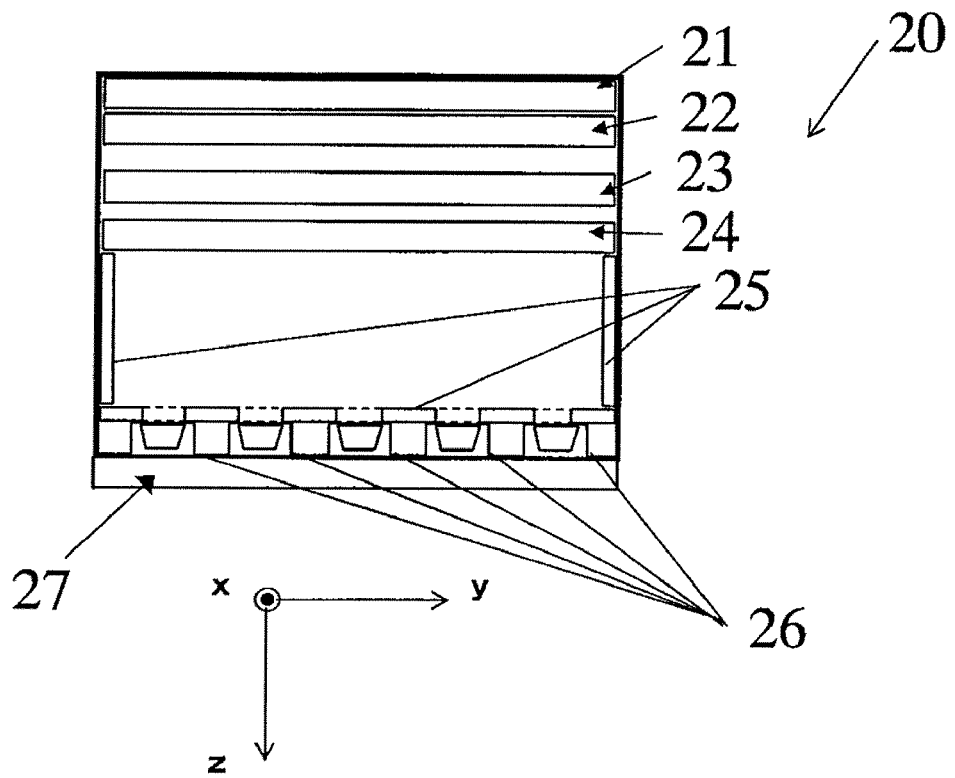
FIG. 3 is a yz cross sectional view of the light source unit of the embodiment.

Next, the description will be made of the light source unit 20 with reference to FIGS. 2 and 3. FIG. 2 shows the xz cross section of the light source unit 20, and FIG. 3 shows the yz cross section thereof. FIGS. 2 and 3 correspond to FIGS. 1B and 1A, respectively.

The light source unit 20 is a bottom LED placement type flat light source apparatus in which the surface-mounted LED light source is placed beneath the diffusing plate 24. In the surface-mounted LED light source, plural LEDs 26 are surface-mounted and arranged two-dimensionally on a substrate 27. The light-emitting surface of each LED 26 faces the direction of the diffusing plate 24 and the emergent surface of the light source unit 20. 28 denotes a chassis (outer frame) that constitutes side walls of the light source unit 20.

A reflecting sheet 25A is provided between the substrate 27 and the diffusing plate 24. The reflecting sheet 25A covers a part other than the light-emitting surface of each LED 26 in a plane on which the plural LEDs 26 are arranged (that is, a planar region parallel to the substrate 27). In the light-emitting surface of each LED 26, an optical aperture 26a through which light actually emerges is formed. The reflecting sheet 25A also covers a part (light-shielding part) other than the optical aperture 26a in the light-emitting surface.

In the reflecting sheet 25A, plural openings 25a through which the light from the optical apertures 26a of the LEDs 26 passes are formed. Providing the reflecting sheet 25A which exposes only the optical apertures 26a in this manner makes it possible to increase the area to re-reflect light reflected on a polarization selective element 22, described later, compared to a case where the reflecting sheet 25A is provided around the entire light-emitting surface.

The polarization selective element 22 is provided at a position farther than the diffusing sheet 24 from the LEDs 26. The polarization selective element 22 transmits the above-mentioned linearly polarized light with the predetermined polarization direction and reflects light with other polarization directions so as to return it to the reflecting sheet side. 'DBEF sheet (trade name)' made by SUMITOMO 3M Limited can be used as the polarization selective element 22, for example.

Light (non-polarized light) from each LED 26 is diffused by the diffusing plate 24 and then enters the polarization selective element 22. Of the non-polarized light, the linearly polarized light with the predetermined polarization direction (P-polarized light in the embodiment), which is necessary to illuminate the liquid crystal panel 2, is transmitted through the polarization selective element 22. On the other hand, of the non-polarized light, S-polarized light with a polarization direction perpendicular to that of the P-polarized light is reflected by the polarization selective element 22 and then transmitted through the diffusing plate 24. This makes the polarization direction of the S-polarized light random, thereby resulting in generation of P-polarized light in the random polarized light.

This newly generated P-polarized light is reflected by the reflecting sheet 25A and then transmitted through the polarization selective element 22. The remaining S-polarized light is reflected by the polarization selective element 22 and then re-enters the diffusing plate 24. The polarization direction of the S-polarized light becomes random when it is transmitted through the diffusing plate 24, and newly generated P-polarized light is transmitted through the polarization selective element 22 via the reflecting sheet 25A and the diffusing plate 24.

By repetition of such an optical action, most of the light that emerged from each LED 26 is converted into P-polarized light, and it is transmitted through the polarization selective element 22 to illuminate the liquid crystal panel 2.

As described above, the light source unit 20 of this embodiment can generate a lot of so-called recycled light that is P-polarized light converted from S-polarized light, which emerged from each LED 26 and was reflected by the polarization selective element 22, and used as illumination light. Therefore it is possible to reduce a loss of light amount compared to a case where only a polarizer is used for obtaining P-polarized light.

The reflecting sheet 25A is not necessarily required to expose the entire optical aperture 26a of each LED 26. It is preferable that the reflecting sheet 25A cover part of the optical aperture 26a because this can increase the area to re-reflect the light reflected by the polarization selective element 22. In this case, however, it is preferable that the area of the part of the optical aperture 26a covered by the reflecting sheet 25A be equal to or less than 20% of the entire area of the optical aperture 26a.

Figure 4:
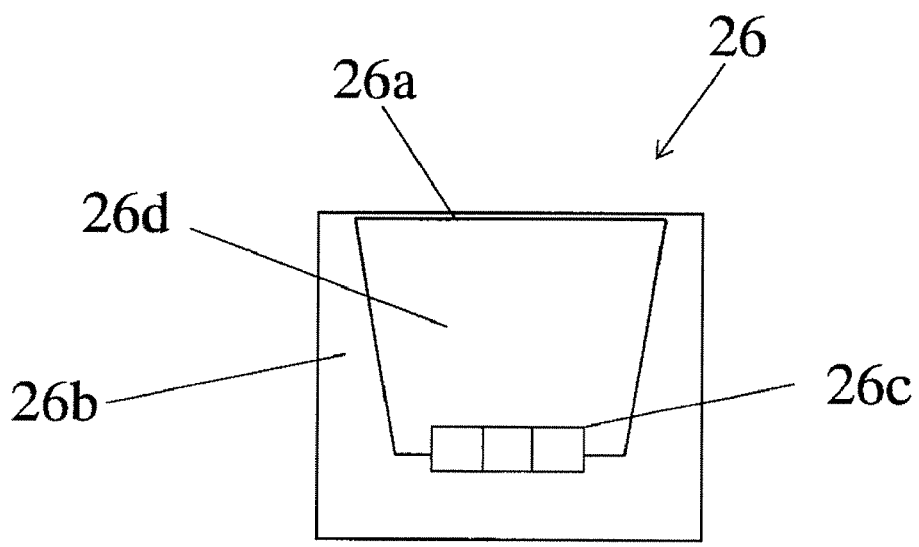
FIG. 4 is a cross sectional view of an LED used in the embodiment.

FIG. 4 shows the cross section structure of the LED 26. The LED 26 is constituted by a package portion 26b which does not emit light, a light-emitting portion 26c which emits light of three (RGB) colors, and the optical aperture 26a which is part of a sealing resin portion 26d and through which the light emerges. The part of the end face of the package portion 26b that surrounds the optical aperture 26a is the above-mentioned light-shielding part.

Figure 5:
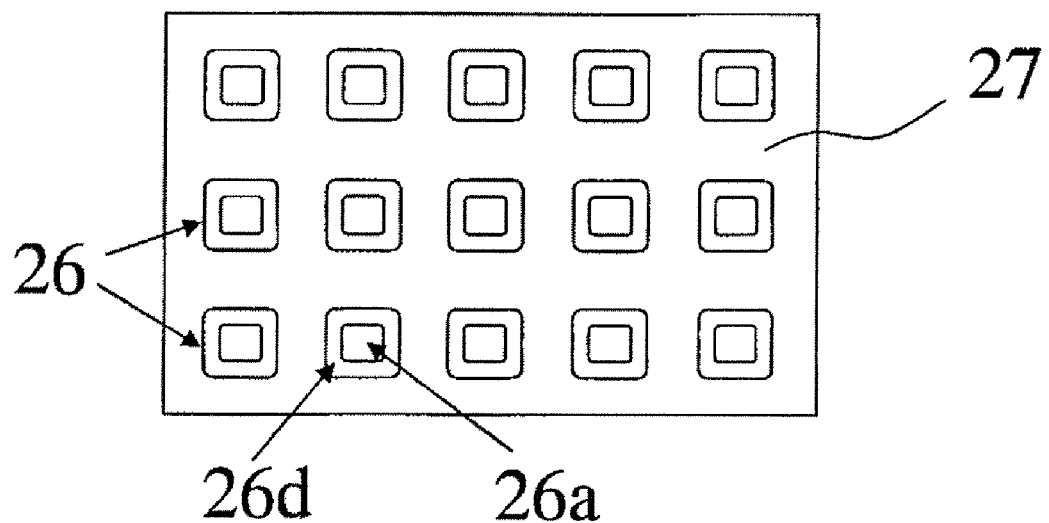
FIG. 5 is a figure showing an example of trial models of the surface-mounted LED light source in the embodiment.
Figure 6:
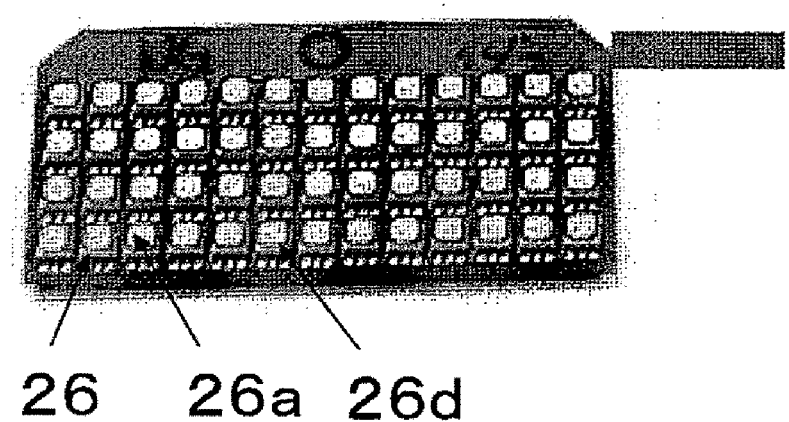
FIG. 6 is a picture showing the example of trial models of the surface-mounted LED light source.
Figure 7:
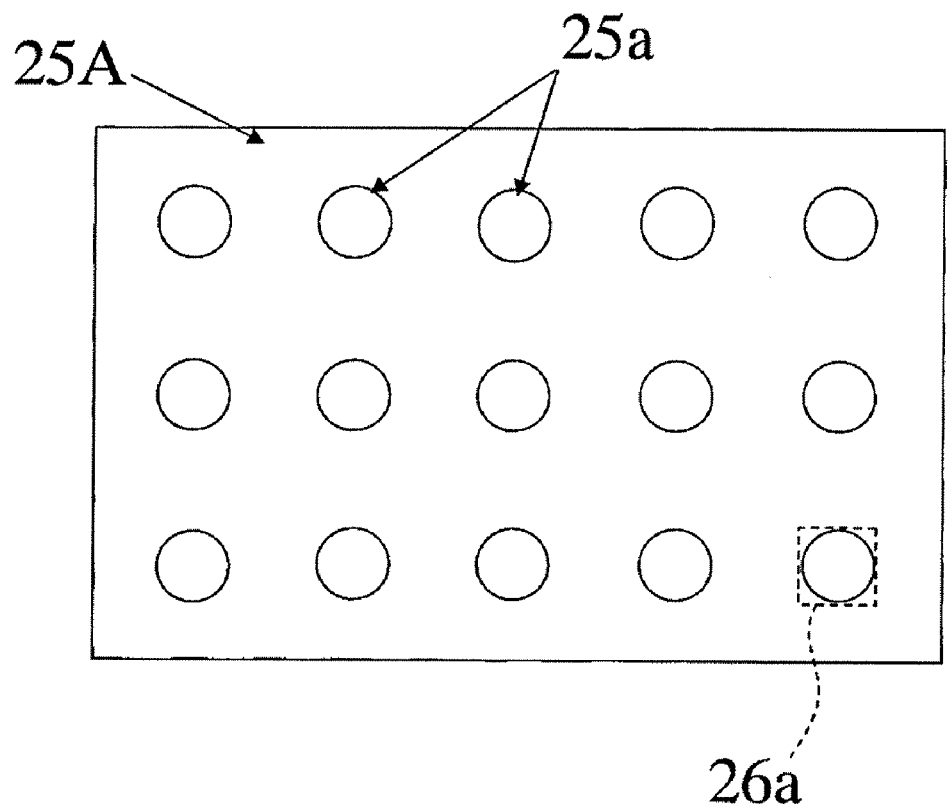
FIG. 7 is a figure showing an example of trial models of a reflecting sheet in the embodiment.
Figure 8:
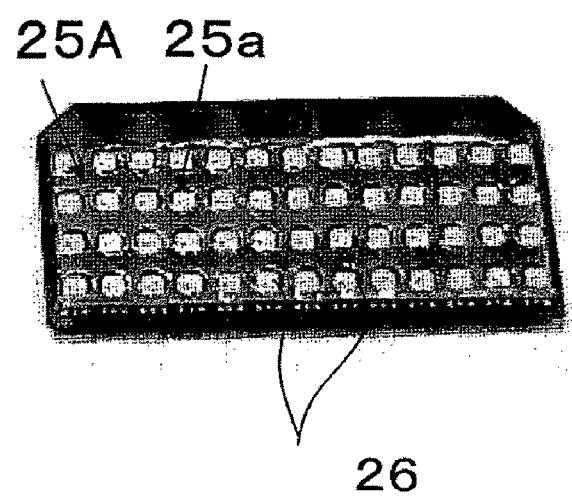
FIG. 8 is a picture showing the configuration in which the trial reflecting sheet is placed on the surface-mounted LED light source shown in FIG. 6.

FIG. 5 shows the surface-mounted LED light source viewed from the light-emerging direction. FIG. 6 shows a picture of a test model example of the surface-mounted LED light source. Further, FIG. 7 shows the reflecting sheet 25A viewed from the light-emerging direction. FIG. 8 shows a picture of the configuration in which the trial reflecting sheet 25A is placed on the surface-mounted LED light source shown in FIG. 6.

The trial surface-mounted LED light source has quadrangular (square) optical apertures 26a, and the trial reflecting sheet 25A has circular openings 25a. Especially in this case, if the part uncovered by the reflecting sheet 25A, that is, the opening 25a formed in the reflecting sheet 25A is too large, the reflecting area of the reflecting sheet 25A is reduced, thereby decreasing the recycled light to deteriorate recycling efficiency of light.

Further, if an area above a certain size is covered by a too-small opening 25a, the shielded component of light from the light-emitting portion 26c increases, thereby decreasing the luminance of the illumination light.

According to the experiment, setting the area of the part of the optical aperture 26a covered by the reflecting sheet 25A to a size equal to or less than 20% of the area of the optical aperture 26a can ensure a sufficient reflecting area of the reflecting sheet 25A and improve light usage efficiency without decreasing the luminance of the illumination light. In a case where the optical aperture 26a has a square shape and the opening 25a has a circular shape as those of the above-mentioned trial model, a relationship may be adopted in which the circular opening 25a is inscribed in the square optical aperture 26a, for example, as shown in the bottom-right part of FIG. 7.

In addition, each LED 26 used in the light source unit 20 of this embodiment has a radiation characteristic in which the luminance becomes 0.5 or less in the range of radiation angles of ±40 or more degrees when the luminance in the direction (0 degree) of the normal to the optical aperture 26a (or, the light-emitting surface) is 1.

Figure 9:
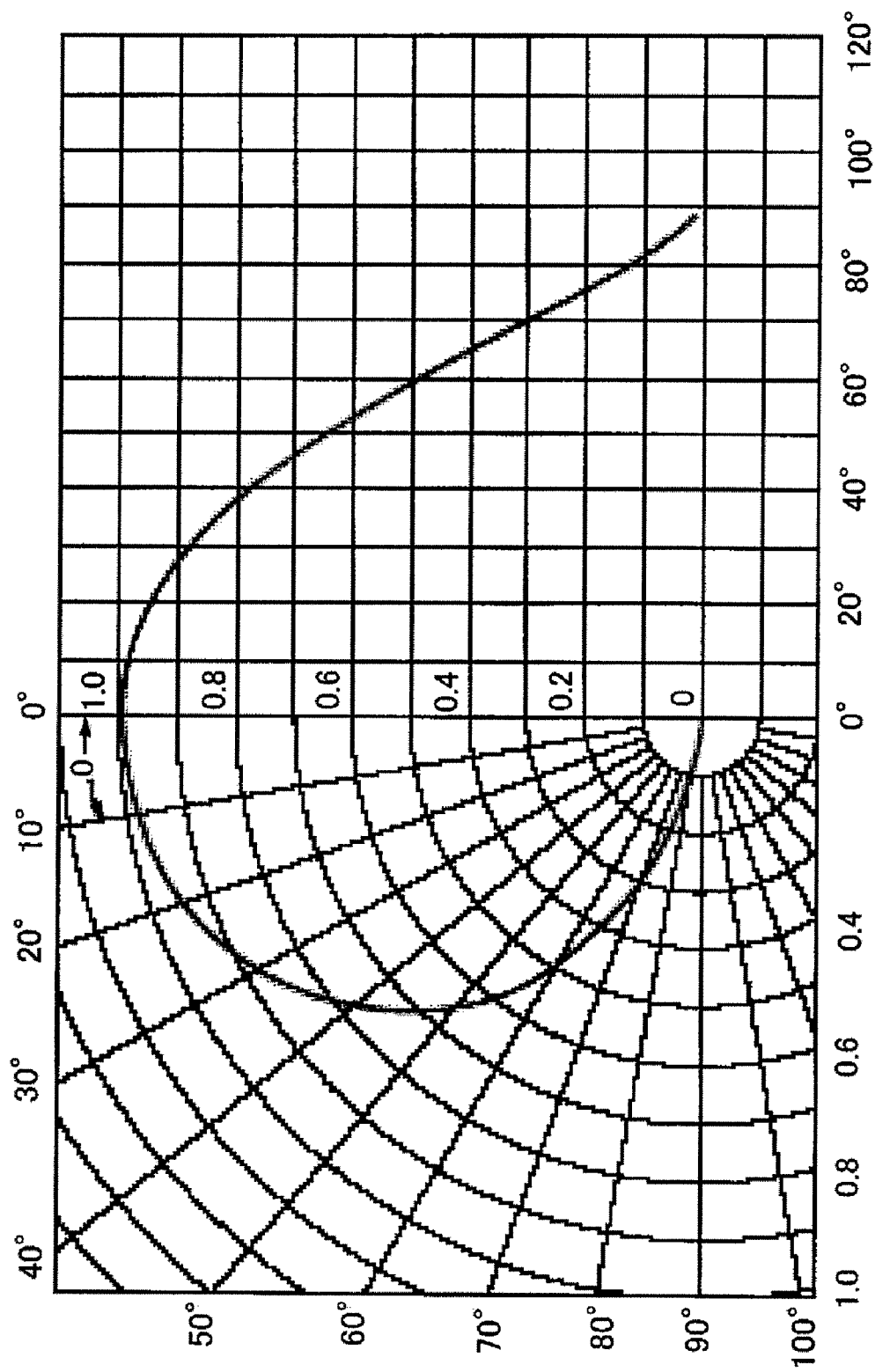
FIG. 9 is a graph showing the characteristics of the LED used in the embodiment.

FIG. 9 shows the radiation characteristic of each LED 26 used in the trial model. The left part of FIG. 9 shows a graph made by plotting the luminance (the horizontal axis) at each radiation angle with respect to the luminance of 1 at the angle of 0 degree. The right part of FIG. 9 shows the luminance (the vertical axis) at each radiation angle (the horizontal axis) with respect to the luminance of 1 at the angle of 0 degree. Both the graphs show the luminance on one side of the radiation angle range divided at the angle of 0 degree.

The LED 26 of the trail model provides the luminance of 0.5 at the radiation angle of ±60 degrees, and unevenness of luminance and color is sufficiently suppressed. The unevenness of luminance and color is actually decreased to a level with no practical problem even at the angle of ±40 degrees.

In the light source unit 20 of this embodiment, a prism sheet 23 that is an optical element having a collecting function is provided between the diffusing plate 24 and the polarization selective element 22. Further, a polarizer (polarizing plate) 21 is provided at a position closer to the emergent surface of the light source unit 20 than the prism sheet 23.

Although this embodiment describes the case where the prism sheet 23 is used as a collecting optical element, collecting optical elements other than the prism sheet may be used.

The prism sheet 23 has prism portions periodically formed in the x direction (one-dimensional direction) of its in-plane directions and each having a triangular cross-sectional shape. Each prism portion increases the collecting power of the prism sheet 23 in the x direction. This is for efficiently illuminating the region of the liquid crystal panel 2 with the illumination light that emerges from the light source unit 20 via the reflecting surface A having no optical power in the xz cross section, as shown in FIG. 1B.

'BEF sheet (trade name)' made by SUMITOMO 3M Limited can be used as the prism sheet 23, for example.

In this embodiment, the prism sheet 23 is provided between the diffusing plate 24 and the polarization selective element 22. This is for enabling free exchange of the prism sheet 23 with no consideration of unevenness of luminance and color, which is sufficiently decreased by the diffusing surface of the diffusing plate 24, when change of the light collecting power of the prism sheet 23 is desired.

Further, since the prism sheet 23 is provided on the side where it is received the light reflected by the polarization selective element 22, the prism sheet 23 also makes the polarization direction of the reflected and returned S-polarized light random as the diffusing plate 24. If the prism sheet 23 is provided at a position closer to the emergent surface than the polarization selective element 22, the P-polarized light transmitted through the polarization selective element 22 is converted into random polarized light by being transmitted through the prism sheet 23, thereby decreasing the P-polarized light which is then transmitted through the polarizer 21. This reduces the luminance of the illumination light.

Meanwhile, if the prism sheet 23 has a shape to sufficiently randomize the polarization direction, the diffusing plate 24 can be removed.

In this embodiment, to preclude the S-polarized light that leaks from the polarization selective element 22, the polarizer 21 is provided at a position closer to the emergent surface than the polarization selective element 22. However, if the amount of the S-polarized light that leaks from the polarization selective element 22 is at a level with no practical problem, the polarizer 21 can be removed.

Furthermore, as described above, each LED 26 used in this embodiment has the light-emitting portion 26c that emits light of three (RGB) colors. It is preferable that the distance between the optical aperture 26a of the LED 26 and the diffusing surface of the diffusing plate 24 be 5 mm or more. This is because the LED 26 has the radiation characteristic that the luminance becomes 0.5 or less in the range of radiation angles of ±40 or more degrees as described above, and it therefore becomes difficult to effectively suppress the unevenness of luminance and color if the distance between the optical aperture 26a and the diffusing surface of the diffusing plate 24 is shorter than 5 mm.

In addition, a reflecting sheet 25B is also provided on the inner side face of the chassis 28 between the substrate 27 and the diffusing plate 24. This makes it possible to reflect light reflected toward the inner side face of the chassis 28 by the reflecting sheet 25A and the diffusing plate 24, toward the diffusing plate 24 and the reflecting sheet 25A, respectively. This results in increase of the recycled light, thereby further reducing the loss of light amount.

Figure 10:
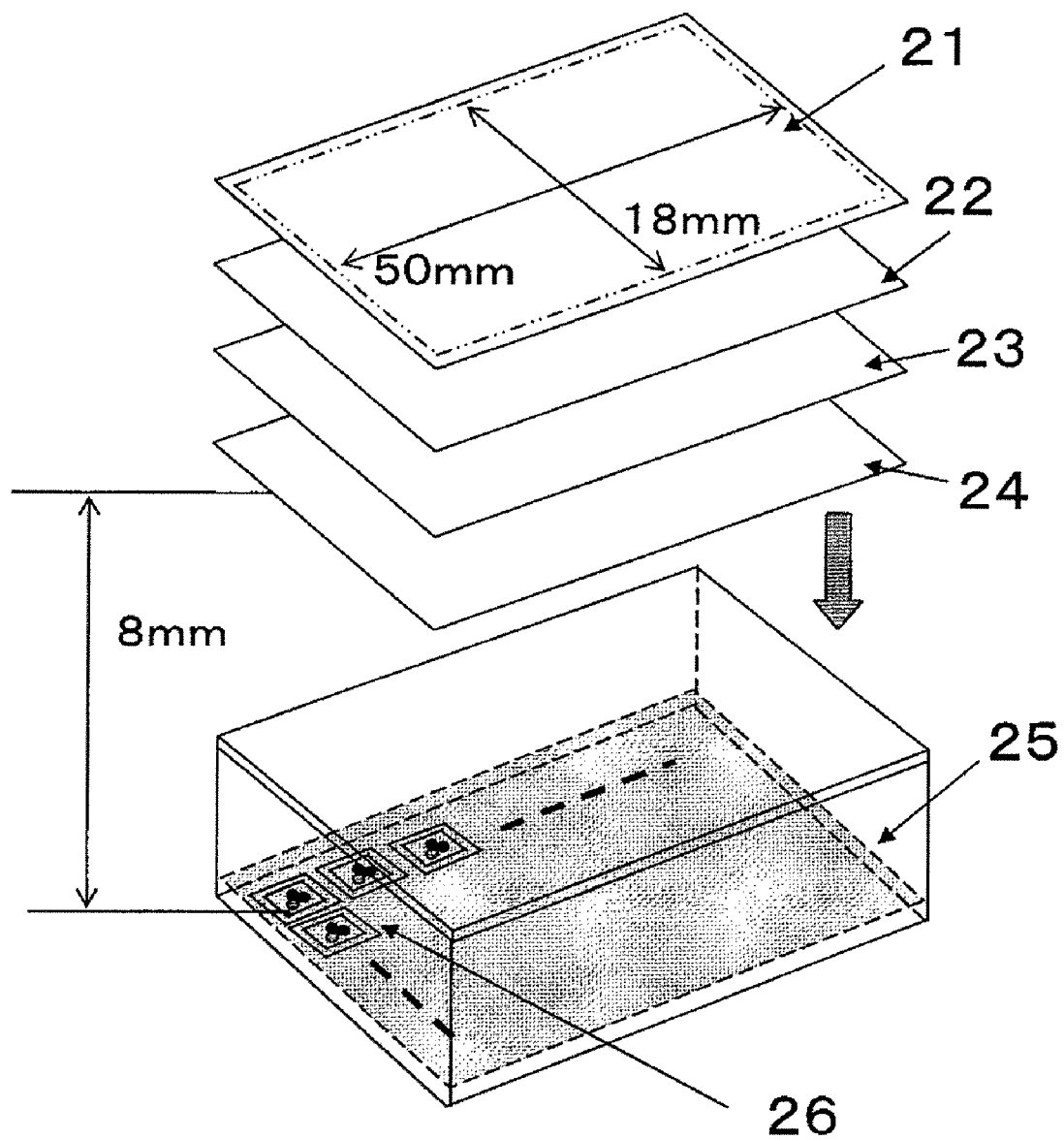
FIG. 10 is an exploded perspective view showing another example of trial models of the light source unit of the embodiment.

FIG. 10 is an exploded perspective view showing another example of trial models of the light source unit 20 made according to this embodiment. FIG. 11 is a layout chart of LEDs on a trial surface-mounted LED light source. These figure show only an example of the trial models, and the present invention is not limited thereto. In other words, the number of the LEDs 26 and the dimensions of each portion are arbitrarily.

As shown in FIG. 11, each LED 26 is a one-chip LED on which light-emitting elements for three (RGB) colors are mounted. A total of fifty-two LEDs 26 arranged in thirteen horizontal rows and in four vertical rows is disposed on the substrate 27. The substrate 27 has a size of 51.2×20.2 mm. The horizontal pitch and vertical pitch between the LEDs 26 are 4 mm and 5.2 mm, respectively, as shown in FIG. 11.

As shown in FIG. 10, the distance between the optical aperture 26a of the LED 26 and the diffusing surface of the diffusing plate 24 is 8 mm. The size of the optical area of the top surface (emergent surface) of the light source unit 20 is 50×18 mm.

AS described above, according to this embodiment, it is possible to realize a flat light source unit with the bottom LED placement in which unevenness of luminance and color is suppressed. In addition, it is possible to realize a flat light source unit which emits linearly polarized light for illuminating a liquid crystal panel with a small loss of light amount and has a required collecting function.

More specifically, according to the embodiment, of light from light-emitting elements, a polarized light component with a predetermined polarization direction is transmitted through a polarization selective element and then emerges from the light source unit. On the other hand, a polarized light component with polarization directions other than the predetermined polarization direction is reflected by the polarization selective element and then reflected by a reflecting surface to re-enter the polarization selective element. Of the re-entering light, a polarized light component whose polarization direction is converted into the predetermined polarization direction is transmitted through the polarization selective element and a polarized light component with polarization directions other than the predetermined polarization direction is re-reflected by the polarization selective element.

The repetition of these reflections until the light is transmitted through the polarization selective element makes it possible to use the light emitted from the light-emitting elements with a high efficiency, in other words, with a small loss of light amount. Further, since the light-emitting elements are placed so that their light-emitting surfaces face the direction of the emergent surface of the light source unit, a greater number of light-emitting elements can be placed than a case where the light-emitting surfaces face the direction different from the emergent surface.

Therefore, illuminating an image-forming element (liquid crystal panel, or the like) with light from such a light source unit makes it possible to achieve a compact image display apparatus capable of providing bright images.

Furthermore, the present invention is not limited to these preferred embodiments and various variations and modifications may be made without departing from the scope of the present invention.

This application claims foreign priority benefits based on Japanese Patent Application No. 2005-253143, filed on Sep. 1, 2005, which is hereby incorporated by reference herein in its entirety as if fully set forth herein.

What is claimed is:

1. A light source apparatus comprising:
  plural light-emitting elements which emit light and are disposed so that their light-emitting surfaces face a direction of an emergence surface of the light source apparatus;
  a polarization selective element which transmits a light component with a first polarization direction and reflects a light component with a second polarization direction different from the first polarization direction, the light components being included in the light emitted from the plural light-emitting elements;
  a reflecting surface which is disposed at a position closer to the light-emitting elements than the polarization selective element and reflects the light reflected on the polarization selective element toward the polarization selective element;
  a diffusing member which is disposed between the reflecting surface and the polarization selective element and diffuses the light from the light-emitting elements and the reflecting surface;
  an optical element which is disposed between the diffusing member and the polarization selective element and has a light-collecting function; and
  a polarizer which is disposed at a position closer to the emergent surface of the apparatus than the polarization selective element and transmits the light component with the first polarization direction that emerged from the polarization selective element,
  wherein the reflecting surface covers at least a part other than optical apertures of the light-emitting elements in a region where the plural light-emitting elements are disposed, and the reflecting surface has openings through which the light from the optical apertures passes.

2. The light source apparatus according to claim 1, wherein the area of a part covered by the reflecting surface in each optical aperture of the light-emitting elements is equal to or less than twenty percent of the area of each optical aperture.

3. The light source apparatus according to claim 1, wherein a radiation angle of each light-emitting element at which a luminance becomes 0.5 or less is ±40 or more degrees when a luminance in a direction of a normal to a light-emitting surface of each light-emitting element is 1 and the direction of the normal is zero degree.

4. The light source apparatus according to claim 1, wherein each light-emitting element includes three light-emitting portions for red, green and blue, and a distance between an optical aperture of each light-emitting element and a diffusing surface of the diffusing member is 5 mm or more.

5. The light source apparatus according to claim 1, wherein another reflecting surface is provided on a part of an inner surface of the light source apparatus, the part being closer to the reflecting surface than the diffusing member.

6. An image display apparatus comprising:
  a light source apparatus;
  an image-forming element which is illuminated with light from the light source apparatus; and
  an optical system which introduces light from the image-forming element to an observer,
  wherein the light source apparatus including:
  plural light-emitting elements which emit light and are disposed so that their light-emitting surfaces face a the direction of an emergence surface of the light source apparatus;
  a polarization selective element which transmits a light component with a first polarization direction and reflects a light component with a second polarization direction different from the first polarization direction, the light components being included in the light emitted from the plural light-emitting elements;
  a reflecting surface which is disposed at a position closer to the light-emitting elements than the polarization selective element and reflects the light reflected on the polarization selective element toward the polarization selective element;
  a diffusing member which is disposed between the reflecting surface and the polarization selective element and diffuses the light from the light-emitting elements and the reflecting surface;
  an optical element which is disposed between the diffusing member and the polarization selective element and has a light-collecting function; and
  a polarizer which is disposed at a position closer to the emergent surface of the apparatus than the polarization selective element and transmits the light component with the first polarization direction that emerged from the polarization selective element,
  wherein the reflecting surface covers at least a part other than optical apertures of the light-emitting elements in a region where the plural light-emitting elements are disposed, and the reflecting surface has openings through which the light from the optical apertures passes.

* * * * *